United States Patent
Vaughn et al.

(10) Patent No.: US 10,450,064 B2
(45) Date of Patent: Oct. 22, 2019

(54) SITUATIONAL COMMAND AND CONTROL OF DRONES

(71) Applicant: Intel Corporation, Santa Clara, CA (US)

(72) Inventors: Robert Lawson Vaughn, Portland, OR (US); Paul R Carbin, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 15/274,637

(22) Filed: Sep. 23, 2016

(65) Prior Publication Data

US 2018/0086451 A1 Mar. 29, 2018

(51) Int. Cl.
*B64C 39/02* (2006.01)
*G08G 5/00* (2006.01)
*G05D 1/00* (2006.01)

(52) U.S. Cl.
CPC ......... *B64C 39/024* (2013.01); *G05D 1/0022* (2013.01); *G08G 5/006* (2013.01); *G08G 5/0013* (2013.01); *G08G 5/0039* (2013.01); *G08G 5/0056* (2013.01); *G08G 5/0069* (2013.01); *G08G 5/0082* (2013.01); *B64C 2201/14* (2013.01); *B64C 2201/146* (2013.01)

(58) Field of Classification Search
CPC ..... B64C 39/024; G05D 1/001; G08G 5/0039
USPC .............................................. 701/2
See application file for complete search history.

(56) References Cited

U.S. PATENT DOCUMENTS

| 6,393,346 B1 * | 5/2002 | Keith ..................... G01C 21/26 340/438 |
| 9,313,667 B1 * | 4/2016 | Daoura ............. H04B 7/18504 |
| 2017/0253330 A1 * | 9/2017 | Saigh .................... B64C 39/024 |
| 2018/0025616 A1 * | 1/2018 | Lin ...................... G08B 29/185 |

* cited by examiner

*Primary Examiner* — Muhammad Shafi
(74) *Attorney, Agent, or Firm* — Schwegman Lundberg & Woessner, P.A.

(57) ABSTRACT

Disclosed herein is a drone. The drone may comprise a flight mechanism, a receiver, and a navigation transmitter. The flight mechanism may execute a flight maneuver provided by a user. The receiver may receive, from an authority, an interruption signal. The interruption signal may include a command to interrupt the flight maneuver provided by the user. The navigation transmitter may transmit, to the flight mechanism, the command to interrupt the flight maneuver to the flight mechanism.

20 Claims, 6 Drawing Sheets

SITUATIONAL COMMAND AND CONTROL OF DRONES

TECHNICAL FIELD

Embodiments described generally herein relate to drones. Some embodiments relate to interrupting flight maneuvers when a drone is operating in an area under flight restrictions.

BACKGROUND

An unmanned aerial vehicle (UAV), commonly known as a drone, is an aircraft without a human pilot aboard. The size of drones may range from small hobby scale suitable for close range operation proximate a user to large scale systems capable of hauling large payloads over many miles. Drones may be used to provide services, perform military operations to reduce risk to human pilots, and as a hobby.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
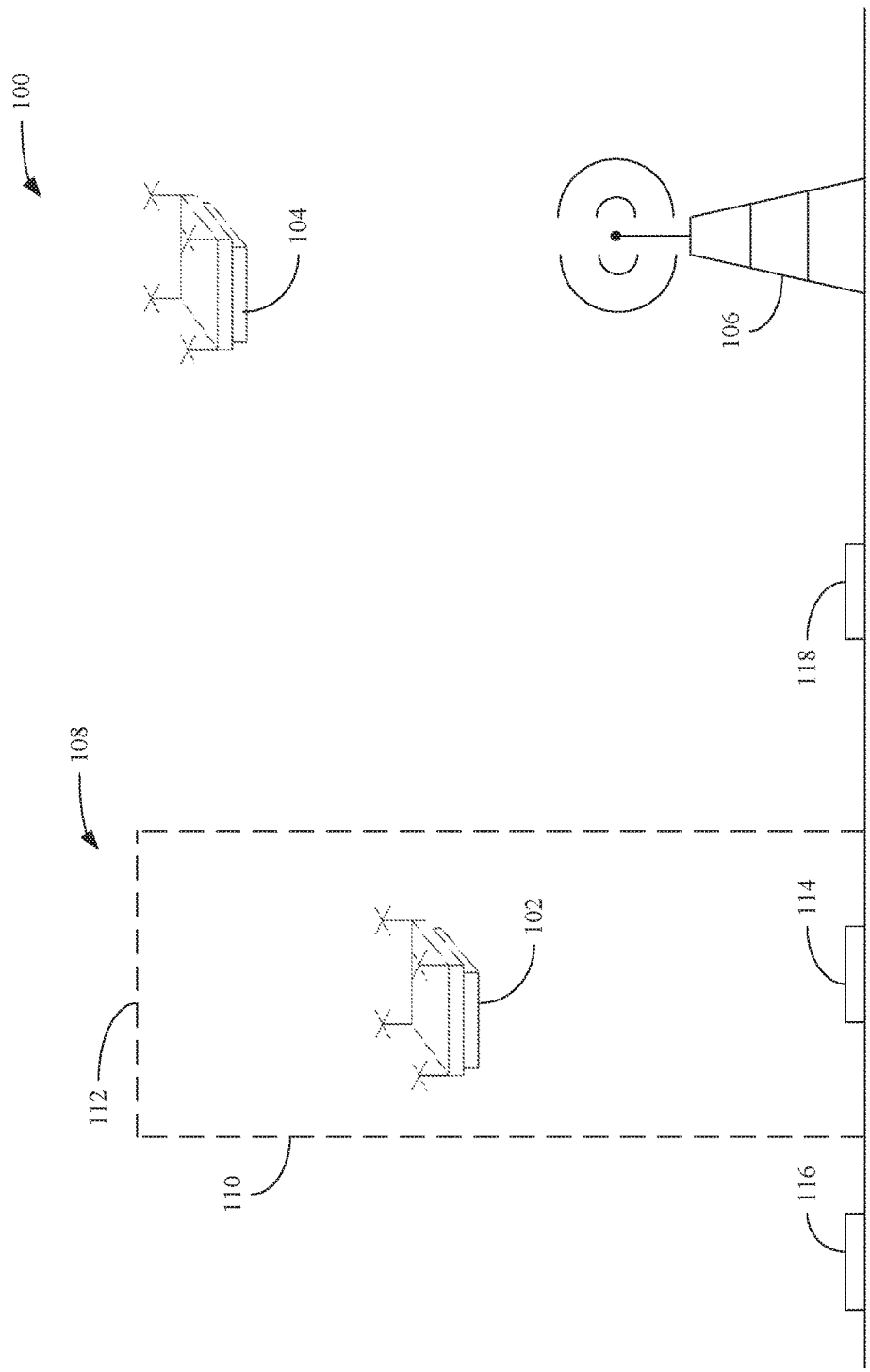
FIG. 1 illustrates an example schematic for providing drone situational command and control in accordance with some embodiments.

Drone usage is becoming more and more common as prices for drones decrease and the capabilities of drones increase. For example, drones with high definition cameras and the ability to fly outside visual range of operators are relatively inexpensive. With the increased drone operations comes the danger that drones will be operated in areas where they are not allowed or pose a safety risks to others.

An authority may issue a directive that limits flight within a given airspace. The authority may be a government agency such as the Federal Aviation Administration (FAA) within the United States or local law enforcement. In the United States, the limiting of flight is referred to as a temporary flight restriction (TFR) or a special flight rules area (SFRA). The TFR or SFRA may define boundaries of airspace with which flight by unauthorized persons or aircraft is prohibited. Non-limiting examples of a TFR include airspace around dignitaries (e.g., the President or Vice-President of the United States while traveling), special events (e.g., sporting events or other large gatherings of people), and areas under a state of emergency or other distress (e.g., natural disaster sites, forest fires).

A SFRA is an area of permanent flight restrictions. Non-limiting examples of SFRAs include airspace around the White House, prisons, power plants, or other fixed locations where an authority may want to limit flight. As used throughout this disclosure, a TFR may refer to any airspace subject to a flight restriction imposed by the authority, regardless of the reason for issuing the flight restrictions or if the flight restrictions are permanent or temporary. Stated another way, TFR and SFRA can be used interchangeably throughout this disclosure.

A TFR may be known in advance or issued on short notice. For example, a TFR for a sporting event is known in advance because the schedule of the sporting event is known in advance. TFRs for dignitaries, emergencies, or other distress situations may not be known in advance due to secrecy concerns or the sporadic nature of emergencies. For example, when a wildfire is going to happen cannot be predicted and a TFR may be needed in areas around the fire for the safety of firefighters and other first responders.

When a TFR exists, drone users may accidently or purposefully enter the TFR. For example, a drone user may not be aware of a dignitary in the area and my accidently fly his or her drone in close proximity to the dignitary. In another instance, the drone operator may wish to obtain footage of a disaster or other emergency situation and may purposely fly his or her drone into restricted airspace.

The flight into restricted airspace may present hazardous conditions because the drone may interfere with other aircraft operating in the area. For example, a drone could inadvertently fly into a flight path of an emergency aircraft and be struck by the emergency aircraft or otherwise interfere with the emergency aircraft's operations.

To minimize hazards presented by unauthorized drone activity and consistent with embodiments disclosed herein, an authority may issue an interrupt command to the drone. The interrupt command may terminate a flight maneuver being executed by the drone. For example, the interrupt command may cause power to rotors of a drone to be cut resulting in the drone landing. For instance, the power may be cut immediately and the drone basically fall out of the sky or the power may be cut gradually resulting in a controlled descent to the ground. The interrupt command may also include commands that cause the drone to return to an initial launch site or to a site controlled by the authority. The use of the interrupt command may increase safety by eliminating unauthorized flight activity within airspace under flight restrictions.

In addition, various embodiments disclosed herein can be implemented by private citizens. For example, celebrities or businesses may wish to prevent drones from flying over a residence or business location. For instance, a celebrity may wish to prevent paparazzi from flying drones over his or her home. Businesses may wish to prevent drone from flying over for safety reasons or to protect trade secrets, etc. The businesses or private citizens may or may not have to interact or otherwise get approval from an authority. For example, a business may have to get permission from the FAA to restrict flight over a particular location.

Turning now to the figures, FIG. 1 illustrates an example schematic of an environment 100 for providing drone situational command and control in accordance with some embodiments.

As illustrated in FIG. 1, the environment 100 may include a user drone 102, an authority aircraft 104, a terrestrial station 106, and a TFR 108. The TFR 108 may be defined by a lateral boundary 110 and a ceiling 112. The lateral boundary 110 may extend a fixed distance from the center of a point of interest 114. The point of interest 114 may be a location of a dignitary, a wildfire, sporting event, etc. The ceiling 112 may be a fixed height above the point of interest 114. For example, for a sporting event, the ceiling 112 may be 2,000 feet above ground level (AGL). For dignitaries, the ceiling 112 may be 5,000 AGL. While FIG. 1 shows the TFR 108 having a cylindrical shape, the TFR may be stepped. For example, the TFR may expand as altitude increases. For instance, from the surface to 2,000 AGL, the TFR may extend 5 nautical miles from the point of interest 114 and from above 2,000 AGL to 5,000 AGL the TFR may extend to 10 nautical miles from the point of interest 114. As used herein, reference to TFR 108 includes the airspace covered by any flight restrictions. Stated another way, TFR 108 includes airspace within the boundaries defined by a notice issued by the authority detailing areas of restricted flight.

During operation, the user drone 102 may fly into the TFR 108, either accidently or on purpose. Upon entering the TFR 108, an authority may be notified. The authority may be notified by avionics onboard the user drone 102, visually seeing the user drone 102, or radar services. For example, the user drone 102 may include an automatic dependent surveillance-broadcast (ADS-B) transponder that reports the position of the user drone 102 to air traffic control (ATC). In addition, the user drone 102 may be seen by the authority aircraft 104.

The authority aircraft 104 may include a drone, a helicopter, an airplane, etc. being operated by the authority. The authority may include government agencies such as the FAA, local, state, or national law enforcement, etc. The authority may have jurisdiction over the airspace covered by the TFR and may be the issuers of the TFR. For example, the FAA may issue the TFR at the request of local law enforcement that may be active in the airspace covered by the TFR. As a result, the authority may be more than one entity.

Upon discovery of the user drone 102 in the TFR 108, an interrupt command may be issued to the user drone 102. The interrupt command may be in the form of an interrupt signal transmitted from the authority aircraft 104 or an interrupt signal transmitted from the terrestrial station 106 under the control of the authority. As disclosed herein, the interrupt signal may be authenticated to prevent rogue users from transmitting interrupt signals under the color of the authority.

For example, the terrestrial station 106 may also be used by the authority aircraft 104 to authenticate the interrupt signal. For example, the authority aircraft 104 may first transmit the interrupt signal to the terrestrial station 106, which may authenticate, or sign, the interrupt signal with a digital certificate. Once authenticated, the terrestrial station 106 may transmit the interrupt signal to the user drone 102 or to the authority aircraft 104. In the case where the terrestrial station 106 authenticates and then transmits an authentication or the authenticated interrupt signal back to the authority aircraft 104, the authority aircraft 104 may transmit the authenticated interrupt signal to the user drone 102.

In another example of authentication, the authority aircraft 104 may transmit the interrupt signal to both the user drone 102 and the terrestrial station 106 simultaneously. Upon receiving the interrupt signal, the user drone 102 may request authentication from the terrestrial station 106. In addition, upon receiving the interrupt signal, the terrestrial station 106 may immediately transmit an authentication signal to the user drone 102 that authenticates the interrupt signal. Time stamps, digital certificates, aircraft identifiers, etc. may be used to authenticate the interrupt signals.

The interrupt signal may include the interrupt command. The interrupt command may cause an interruption in a flight maneuver being executed by the user drone 102. For example, the flight maneuver could be hovering, climbing, descending, or otherwise flying over the point of interest 114. The interrupt command may cause power to be removed from a flight mechanism of the user drone 102. For example, the interrupt command may cause the rotors of the user drone 102 to immediately or gradually stop resulting in a crash or gradual landing of the user drone 102.

In addition, the interrupt command may cause the user drone 102 to land a particular location. For example, the interrupt command may cause the user drone 102 to land at an initial launch site 116 of the user drone 102 or a site 118 controlled by the authority. For instance, the user drone 102 may be forced to land at the site 118 controlled by the authority so that the authority may obtain information from the user drone 102 such as a registration number or other information that may be used to identify the user of the user drone 102. In addition, the interrupt command may cause the user drone 102 to transmit identification information to the authority. The identification information may be used to track the user of the user drone 102 and issue appropriate sanctions or otherwise track violations committed by the user.

The interrupt command may also include a delay. For example, upon receiving the interrupt signal a message may be transmitted to the user of the user drone 102 informing the user that the user drone 102 is operating in the TFR 108. The message may inform the user that unless the user drone 102 is removed from the TFR 108, an interrupt command will be executed that disables the user drone 102. Disabling the user drone may include disabling power to the flight mechanism of the user drone 102 or preventing the user of the user drone 102 from providing further control input to the user drone 102.

The amount of time for the delay may be specified in the interrupt signal and may range from, for example, 30 seconds to 5 minutes. The length of time for the delay may be a function of the reason for the TFR. For instance, operation near a dignitary or emergency site may warrant a short delay while operation proximate a sporting event may warrant a longer delay.

Figure 2:
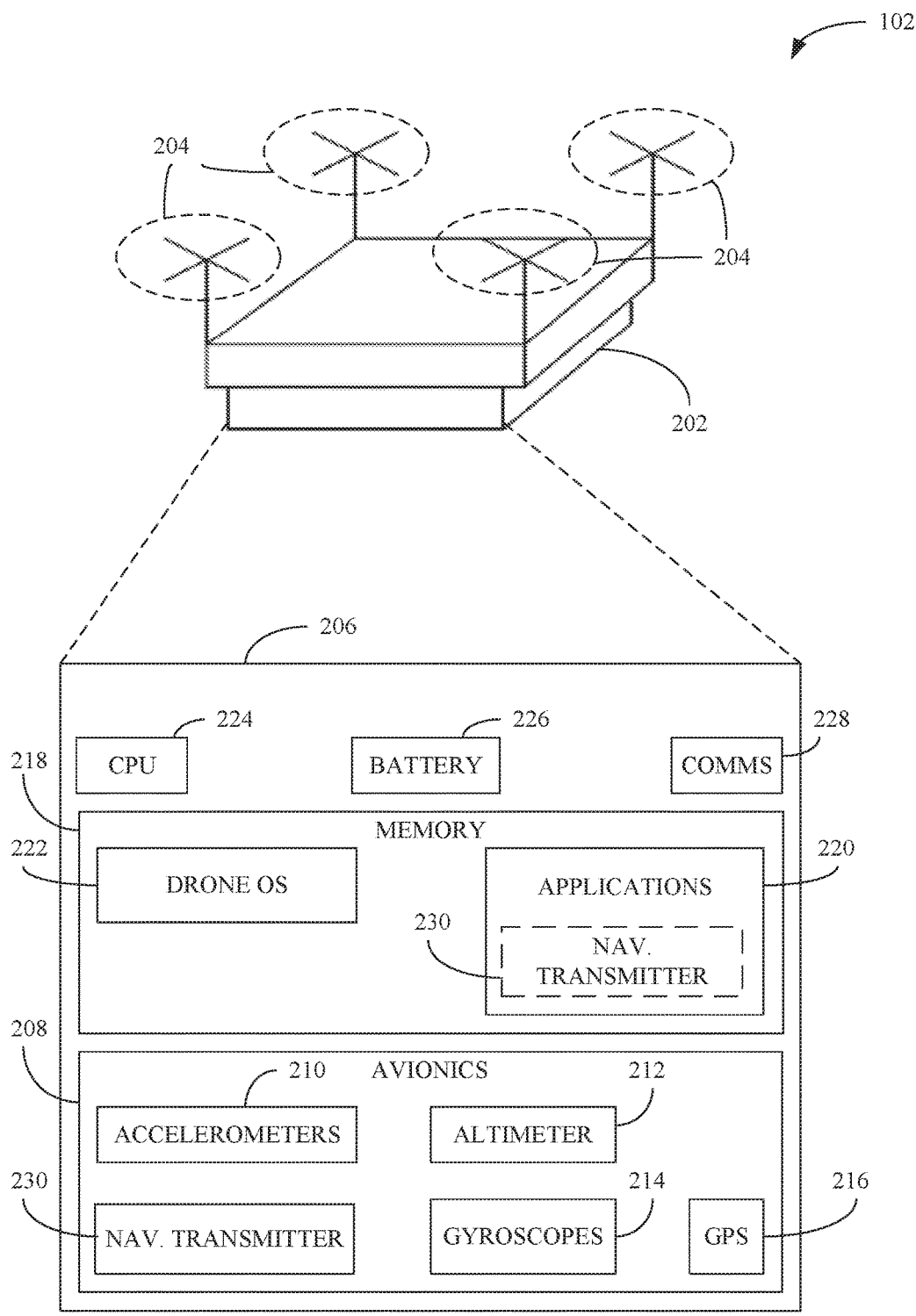
FIG. 2 illustrates an example schematic of a drone in accordance with some embodiments.

Turning now to FIG. 2, FIG. 2 shows an example schematic of the user drone 102. As shown in FIG. 2, the user drone 102 may include an airframe 202, a flight mechanism 204, and computing environment 206. The airframe 202 may be made of made of polymers, metals, etc. and the other components of the user drone 102 may be secured to the airframe 202.

The flight mechanism 204 may include mechanisms that may propel the user drone 102 through the air. For example, the flight mechanism 204 may include propellers, rotors, turbofans, turboprops, etc. The flight mechanism 204 may operably interface with avionics 208. The avionics 208 may be part of the computing environment 206 (as shown in FIG. 2) or standalone components. For example, the avionics 208 may include accelerometers 210, an altimeter 212, gyroscopes 214, and a global positioning system (GPS) receiver 216.

The various components of the avionics 208 may be standalone components or may be part of an autopilot system or other avionics package. For example, the altimeter 212 and GPS receiver 216 may be part of an autopilot system that includes one or more axes of control. For instance, the autopilot system may be a two-axis autopilot that may maintain a preset course and hold a preset altitude. The avionics 208 may be used to control in-flight orientation of the user drone 102. For example, the avionics 208 may be used to control orientation of the user drone 102 about pitch, bank, and yaw axes while in flight.

The avionics 208 may allow for autonomous flight. For example, as described herein, the user drone 102 may determine a flightpath to the initial launch site 116 or the site 118 controlled by the authority after receiving the interrupt signal. In addition, the avionics 208 may include a navigation transmitter 230 that may be used to transmit commands to the flight mechanism 204.

While FIG. 2 shows the navigation transmitter 230 as part of the avionics 208, the navigation transmitter may be software stored in a memory 218 as shown by dashed navigation transmitter 230.

The computing environment 206 may also include the memory 218 that may store applications 220 and a drone operating system (OS) 222. The applications 220 may include audio and video capturing software, etc. For example, the applications 220 may include a surveillance program that may utilize a camera to perform aerial surveillance. The applications 220 may include a communications program that may allow user drone 102 to communicate with the authority aircraft 104 and the terrestrial station 106. In addition, the applications 220 may include software to that functions as the navigation transmitter 230.

The memory 218 may provide a secure area for storage of components used to authenticate communications between the user drone 102 and the authority aircraft 104 and the terrestrial station 106. For example, the memory 218 may store SSL certificates or other security tokens. The data stored in the memory 218 may be read-only data such that during operation the data cannot be corrupted or otherwise altered by malware or viruses by other users that may try and take control of the user drone 102.

The computing environment 206 may include a central processing unit (CPU) 224, a battery 226, and a communications interface 228. The CPU 224 may be used to execute operations and method steps, such as those described herein with regard to FIGS. 3 and 4. The memory 218 also may store data received by the user drone 102 as well as programs and other software utilized by the user drone 102. For example, the memory 218 may store instructions that, when executed by the CPU 224, cause the CPU 242 to perform operations such as those described herein.

The communications interface 228 may include transmitters, receivers, or transceivers that may be used to communicate with the authority aircraft 104 and the terrestrial station 106. For example, the communications interface 228 may include an automatic dependent surveillance-broadcast (ADS-B) receiver (ADS-B In) or transmitter (ADS-B Out) that may send and receive data. In addition, the communications interface 228 may include a cellular interface or other wireless credential exchange modules. For example, the communications interface 228 may include an ADS-B In and Out module that allows the user drone 102 to transmits its position to ATC facilities and also allow the user drone 102 to receive the interrupt signal transmitted by the authority aircraft 104 or the terrestrial station 106.

While FIG. 2 shows various components of the user drone 102, not all components shown in FIG. 2 are required. For example, user drone 102 may not have the gyroscopes 214, the altimeter 212, etc. In addition, while FIG. 2 has been described with reference to the user drone 102, the schematic shown in FIG. 2 may also represent the authority aircraft 104. For example, the authority aircraft 104 may be a drone or other aircraft with similar components as the user drone 102.

Figure 3:
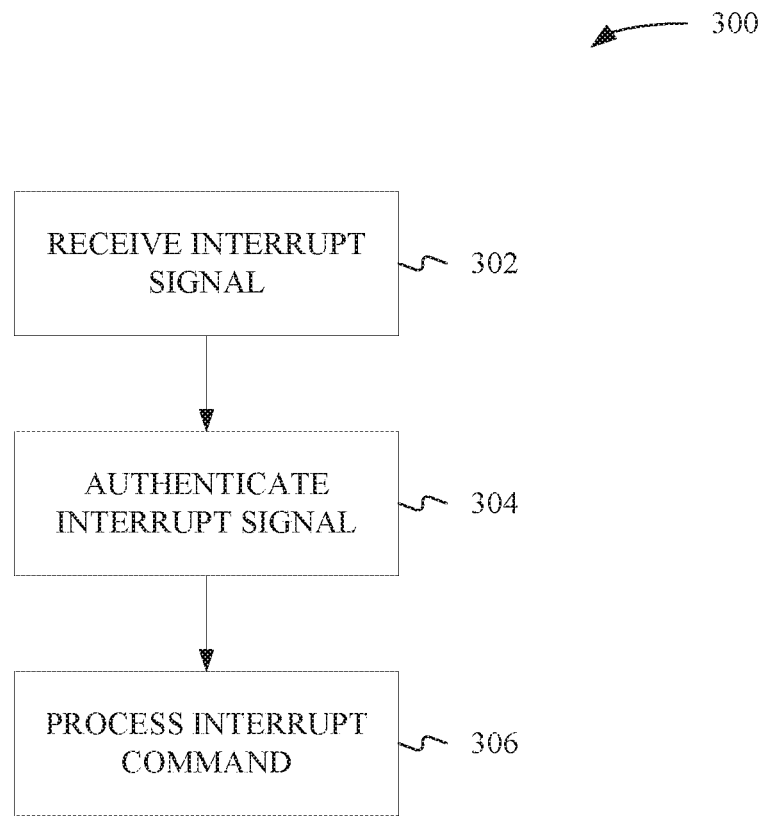
FIG. 3 illustrates an example method in accordance with some embodiments.

FIG. 3 illustrates an example method 300 in accordance with some embodiments disclosed herein. The method 300 may begin at stage 302 where an interrupt signal may be received. For example, the user drone 102 may receive the interrupt signal. The interrupt signal may be received in response to a drone, such as the user drone 102, entering airspace covered by a TFR, such as the TFR 108. As detailed herein, the interrupt signal may be received from an airborne object, such as the authority aircraft 104, or a terrestrial object, such as the terrestrial station 106.

In addition to transmitting the interrupt signal to the drone, the interrupt signal may be transmitted directly to a user. For example, the drone may be identified by ADS-B information and ATC may utilize the information to located contact information for the user. With the contact information, the interrupt signal, or a message indicating the interrupt signal has been sent to the drone, may be sent to the user's cell phone or other network connected device. For example, an email or text message may be sent simultaneously with the interrupt signal or as part of the interrupt signal to the user.

From stage 302, the method 300 may proceed to stage 304 where the interrupt signal may be authenticated. As detailed herein, a third party, such as a user of the terrestrial station 106 may authentic interrupt signals received from authority aircraft 104. In addition, the terrestrial station 106 or the authority aircraft 104 may self-authenticate using digital certificates and other authentication mechanism such as digital handshakes, etc.

From stage 304, the method 300 may proceed to stage 306 where an interrupt command may be processed to the flight mechanism of the drone. For example, the interrupt command may decrease power to the flight mechanism to force the drone to land. The interrupt command may also command the drone to land at an original launch point or at a location controlled by the authority as described herein.

In certain instances, a drone may be operating in airspace not covered by a TFR and a TFR may be declared without the user of the drone's knowledge. For example, the user may be operating a drone doing aerial surveillance over an event and local law enforcement may issue an ad hoc TFR due to growing security concerns or other law enforcement activity. For instance, law enforcement may need to operate a helicopter over an event and issue a temporary TFR to reduce air traffic in the area. Upon issuing the TFR, the drone may receive the interrupt signal as part of a notice of the TFR. The notice of the TFR may include a time for the drone to take action to remove itself from the TFR. For example, upon receiving the notice of the TFR the drone may transmit a message to the user of the TFR and advise the user he or she has X minutes to remove the drone from the TFR. Should the drone not exit the TFR in the prescribed time, the drone may be instructed to land at a site controlled by the authority. In addition, notice of the TFR may include a command for the drone to return to an initial launch site.

The use of the interrupt commands may be used to allow certain drones into the TFR while restricting others. For example, media or other credentialed drones may be allowed to operate within the TFR while restricting other drones from the TFR. The media or other credentialed drones may communicate credentials via ADS-B Out information or other wireless communications with the authority. The authority may then transmit an interrupt signal to the drone that limits movement of the drone. For example, the interrupt signal may allow media drones to operate within the TFR, but not below or above a certain altitude. For instance, the interrupt signal may include a command to limit the altitude of a media drone to at or below 2,000 feet AGL.

Figure 4:
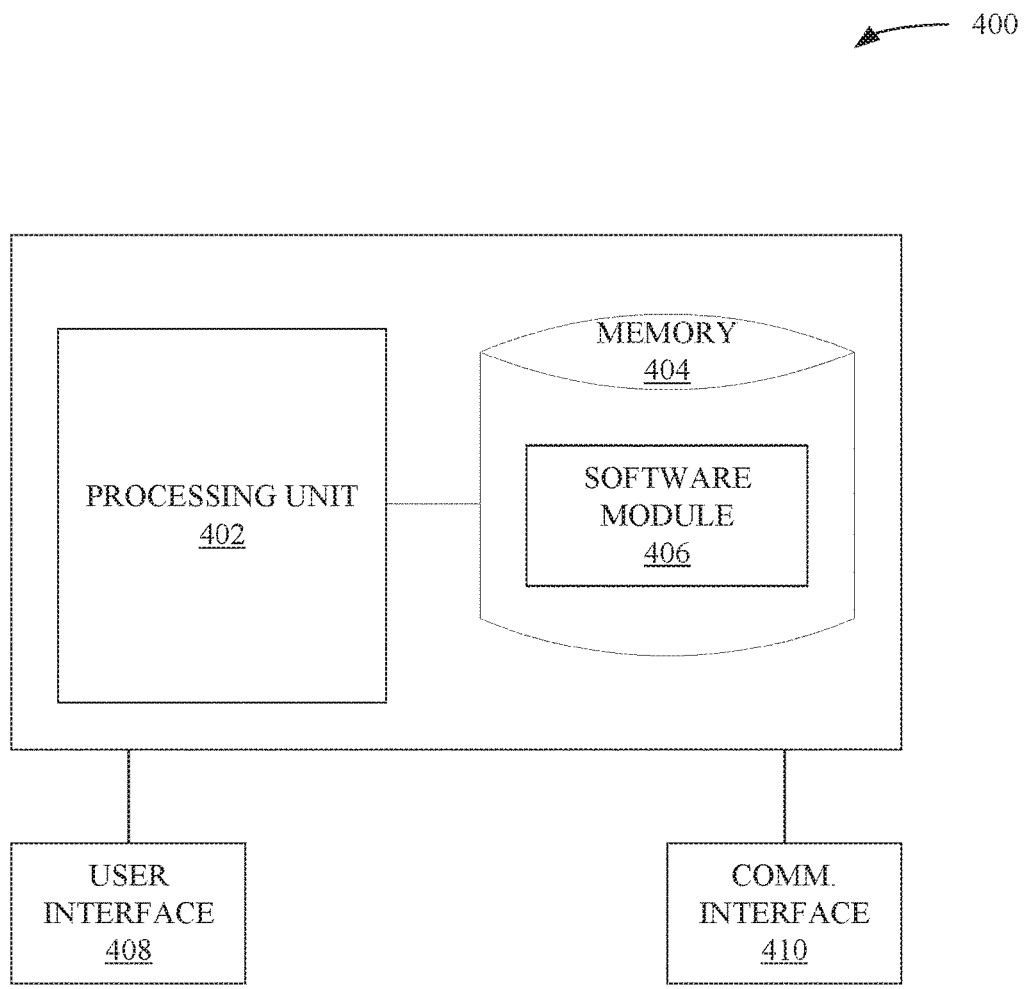
FIG. 4 illustrates an example computing device in accordance with some embodiments.

FIG. 4 shows an example schematic of computing device 400. The computing device may be implemented as part of the user drone 102, the authority aircraft 104, or as part of the terrestrial station 106. As shown in FIG. 4, computing device 400 may include a processing unit 402 and a memory unit 404. Memory unit 404 may include a software module 406. While executing on processing unit 402, software module 406 may perform processes for commanding a drone, including, for example, one or more stages included in method 500 described below with respect to FIG. 5.

Computing device 400 may include a user interface 408. User interface 408 may include any number of devices that allow a user to interface with computing device 400. Non-limiting examples of the user interface 408 include a keypad, joystick, a display (touchscreen or otherwise), etc.

Computing device 400 may include a communications interface 410. Communications interface 410 may allow computing device 400 to communicate with the user drone 102, the authority aircraft 104, or the terrestrial station 106. Non-limiting examples of the communications interface 410 include ADS-B In/Out modules, cellular modules, Ethernet cards (wireless or wired), Bluetooth® transmitters and receivers, near-field communications modules, etc.

Computing device 400 may be implemented using a personal computer, a network computer, a mainframe, a handheld device, a personal digital assistant, a smartphone, or any other similar microcomputer-based workstation. Computing device 400 may be located in close proximity to the terrestrial station 106. For example, the computing device 400 may be located at an ATC facility, a law enforcement command center, etc. Computing device 400 may also be remote from the terrestrial station 106. For instance, computing device 400 may be located at an ATC facility that is not in close proximity to a transmitter. For instance, computing device 400 may be part of an ATC facility, such as a center control facility, and the associated terrestrial station, or transmitter may be located miles away from the ATC facility.

As used herein, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the processing unit 402 or any other module) and that cause a machine to perform any one or more of the techniques of the present disclosure, or that is capable of storing, encoding or carrying data structures used by or associated with such instructions. In other words, the memory unit 404 may include instructions and may therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices, magnetic disks, such as internal hard disks and removable disks; magneto-optical disks; and CD-ROM and DVD-ROM disks.

The instructions may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Figure 5:
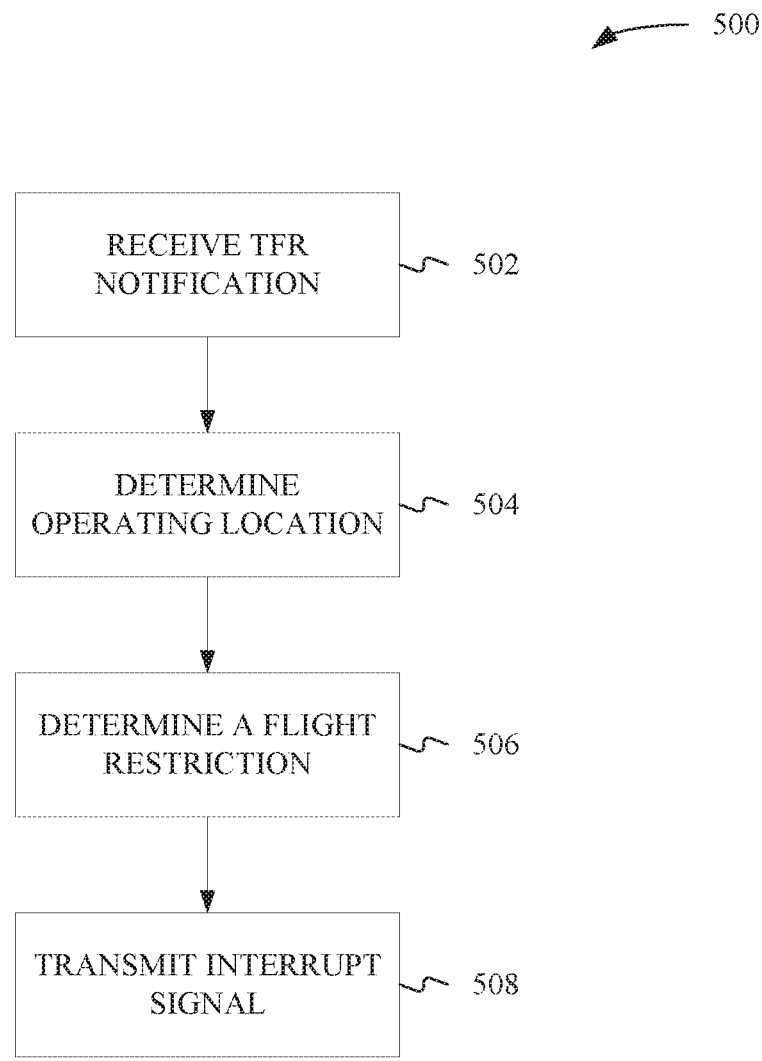
FIG. 5 illustrates an example method in accordance with some embodiments.

FIG. 5 illustrates an example method 500 in accordance with some embodiments disclosed herein. The method 500 may begin at stage 502 where notification of a TFR may be received. As disclosed herein, the TFR information may be received at the user drone 102, the authority aircraft 104, and/or the terrestrial station 106. The notification of the TFR may be in the form of a Notice to Airman (NOTAM), via ADS-B communications, etc.

From stage 502, the method 500 may proceed to stage 504 where an operating location may be determined. For example, the computing device 400 may utilize ADS-B or GPS information to determine that a drone, such as the user drone 102, is operating in airspace over which the authority has jurisdiction.

From stage 504, the method 500 may proceed to stage 506 where a determination may be made as to whether the airspace the drone is operating in is under a TFR. For example, the location of the drone may be compared with the TFR information received in stage 502 to determine if the drone is operating in a location that is subject to a flight restriction.

From stage 506, the method 500 may proceed to stage 508 where an interrupt signal may be processed. As described herein, the interrupt command may be transmitted from the terrestrial station 106, the authority aircraft 104, or generated by the user drone 102. In addition, the interrupt signal may be authenticated as described herein.

The method 500 may be carried out by the user drone 102. For example, drones may be programmed to avoid TFRs or other restricted airspace. For example, drones may include a database of airports or other SFRAs (e.g., airspace around the White House or other government buildings such as prisons). Using the database, the drone OS 222 and applications 220 may automatically prevent the drone from flying into known TFRs. Using the same applications, the drones may be programmed to avoid ad hoc or other non-permanent TFRs. For example, using the method 500 the drones may receive TFR information using ADS-B In receivers. Upon receiving the TFR information, the drone may used GPS data to determine if it is within a TFR. If it is within a TFR, the drone may generate an interrupt signal or interrupt command and immediately fly out of the TFR. For example, after receiving the TFR notice, the drone may define a flight path that will removed the drone from the TFR in the shortest time. If the drone is not within a TFR, the TFR data may be used to prevent the drone from flying into the TFR.

The method 500 may also be carried out by the authority aircraft 104 or the terrestrial station 106. For example, the terrestrial station 106 may receive TFR information as well as receive location information from the user drone 102. The terrestrial station 106, using for example computing device 400, may determine if the user drone is operating in a TFR and if so, transmit an interruption signal to the user drone 102.

Figure 6:
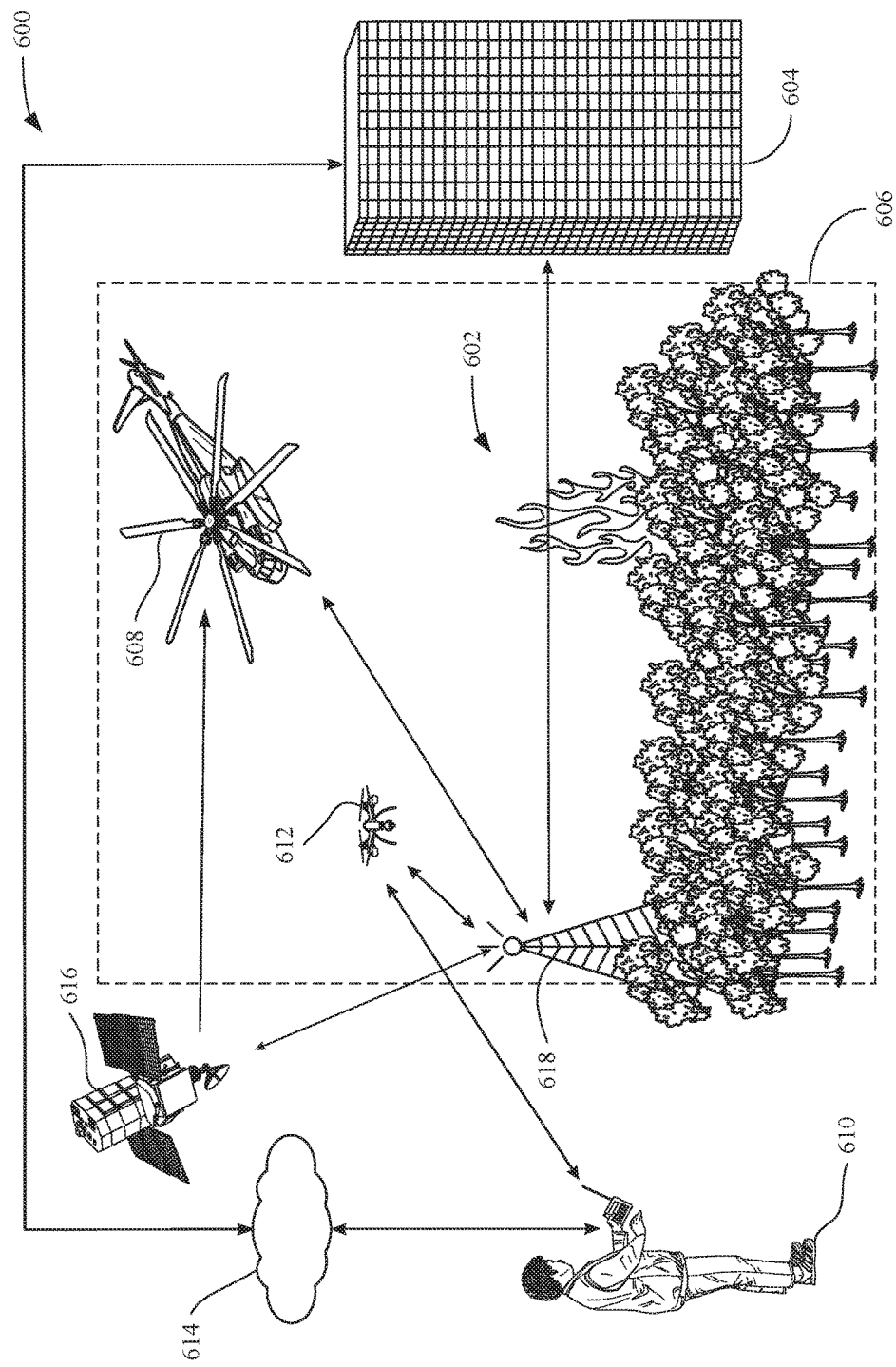
FIG. 6 illustrates an example operating environment in accordance with some embodiments.

FIG. 6 illustrates an example operating environment 600 in accordance with some embodiments. As shown in FIG. 6, the example operating environment 600 can include a disaster 602. The disaster 602 can be a natural disaster or manmade. For instance, as shown in FIG. 6, the disaster 602 can be a forest fire, either caused by lightening or arson. In response to the disaster 602, an authority 604, such as the FAA, can issue a TFR that can define a boundary 606 subject to flight restrictions for the safety of emergency response equipment 608 responding to the disaster 602.

In addition, a user 610 may be operating a drone 612 within the boundary 606 of the TFR. The user 610 may or may not be aware of the TFR. As a result, the user 610 may or may not know that operation of the drone 612 with the boundary 606 of the TFR is prohibited. Moreover, operation of the emergency response equipment 608 could be impacted by the presence of the drone 612. For example, as the emergency response equipment 608 is attempting to rescue hikers or campers or apply fire suppressant, the drone 612 may inadvertently enter a flight path of the emergency response equipment 608.

Regardless of whether the user 610 is aware of the TFR or not, the authority 604 or operators of the emergency response equipment 608 may want to seize control of the drone 612 in order to prevent the drone 612 from interfering with operation of the emergency response equipment 608.

The user 610 can be notified of the TFR because the authority 604 can transmit the TFR over a network 614 or via a terrestrial network that can include a satellite 616 and a terrestrial station 618. Using the network 614, the satellite 616, the terrestrial station 618, or a combination thereof, the authority 604 or the operators of the emergency response equipment 608 can issue termination commands as described herein to take control of the drone 612. In addition, using the network 614, the satellite 616, the terrestrial station 618, or a combination thereof, the drone 612 and/or the user 610 can authenticate the termination commands to prevent unauthorized persons from taking control of the drone 612. As described herein, the termination commands can cause the drone 612 to land immediately regardless of its current location or fly to a designated site, such as an original launch site or a site designated by the authority 604.

ADDITIONAL NOTES & EXAMPLES

Example 1 is a drone operated by a user and interruptible by an authority, the drone comprising: a flight mechanism for executing a flight maneuver provided by the user; a receiver to receive, from the authority, an interruption signal, the interruption signal including a command to interrupt the flight maneuver provided by the user; and a navigation transmitter to transmit, to the flight mechanism, the command to interrupt the flight maneuver to the flight mechanism.

In Example 2, the subject matter of Example 1 optionally includes wherein the authority is law enforcement.

In Example 3, the subject matter of any one or more of Examples 1-2 optionally include wherein the interruption signal is received in response to the drone entering a no-fly zone.

In Example 4, the subject matter of any one or more of Examples 1-3 optionally include wherein the command to interrupt the flight maneuver includes a command to immediately interrupt power to a portion of the flight mechanism.

In Example 5, the subject matter of any one or more of Examples 1-4 optionally include wherein the command to interrupt the flight maneuver includes a command to gradually reduce power to a portion of the flight mechanism.

In Example 6, the subject matter of any one or more of Examples 1-5 optionally include wherein the command to interrupt the flight maneuver includes a command to land the drone at a particular location.

In Example 7, the subject matter of Example 6 optionally includes wherein the particular location is an initial launch site of the drone.

In Example 8, the subject matter of any one or more of Examples 6-7 optionally include wherein the particular location is a landing site controlled by the authority.

In Example 9, the subject matter of any one or more of Examples 1-8 optionally include wherein the command to interrupt the flight maneuver includes a command to prevent further input to the drone by the user.

In Example 10, the subject matter of any one or more of Examples 1-9 optionally include wherein the command to interrupt the flight maneuver is transmitted at a predetermined time after receiving the interruption signal.

In Example 11, the subject matter of Example 10 optionally includes wherein the interruption signal includes data defining the predetermined time.

In Example 12, the subject matter of any one or more of Examples 1-11 optionally include an authentication module to authenticate the interruption signal.

In Example 13, the subject matter of any one or more of Examples 1-12 optionally include wherein the receiver includes at least one of the following: an automatic dependent surveillance-broadcast in receiver and a cellular receiver.

In Example 14, the subject matter of any one or more of Examples 1-13 optionally include a transmitter for transmitting a position of the drone.

In Example 15, the subject matter of Example 14 optionally includes wherein the transmitter includes an automatic dependent surveillance-broadcast out transmitter.

Example 16 is a drone operated by a user and interruptible by an authority, the drone comprising: a flight mechanism operative to execute a flight maneuver provided by the user; a processor in electrical communication with the flight mechanism; and a memory storing instructions that, when executed by the processor, cause the processor to: receive an interruption signal, the interruption signal received from the authority and including a command to interrupt the flight maneuver; and transmit the command to interrupt the flight maneuver to the flight mechanism.

In Example 17, the subject matter of Example 16 optionally includes wherein the authority is law enforcement.

In Example 18, the subject matter of any one or more of Examples 16-17 optionally include wherein the interruption signal is received in response to the drone entering a no-fly zone.

In Example 19, the subject matter of any one or more of Examples 16-18 optionally include wherein the command to interrupt the flight maneuver includes a command to immediately interrupt power to the flight mechanism.

In Example 20, the subject matter of any one or more of Examples 16-19 optionally include wherein the command to interrupt the flight maneuver includes a command to gradually reduce power to the flight mechanism.

In Example 21, the subject matter of any one or more of Examples 16-20 optionally include wherein the command to interrupt the flight maneuver includes a command to land the drone at a particular location.

In Example 22, the subject matter of Example 21 optionally includes wherein the particular location is an initial launch site of the drone.

In Example 23, the subject matter of any one or more of Examples 21-22 optionally include wherein the particular location is a landing site controlled by the authority.

In Example 24, the subject matter of any one or more of Examples 16-23 optionally include wherein the command to interrupt the flight maneuver includes a command to prevent further input to the drone by the user.

In Example 25, the subject matter of any one or more of Examples 16-24 optionally include wherein the command to interrupt the flight maneuver is transmitted at a predetermined time after receiving the interruption signal.

In Example 26, the subject matter of Example 25 optionally includes wherein the interruption signal includes data defining the predetermined time.

In Example 27, the subject matter of any one or more of Examples 16-26 optionally include wherein the instructions, when executed by the processor, further cause the processor to authenticate the interruption signal.

In Example 28, the subject matter of any one or more of Examples 16-27 optionally include a receiver to receive the interruption signal from the authority, wherein the receiver includes at least one of the following: an automatic dependent surveillance-broadcast in receiver and a cellular receiver.

In Example 29, the subject matter of any one or more of Examples 16-28 optionally include a transmitter electrically coupled to the processor and operative to transmit a position of the drone.

In Example 30, the subject matter of Example 29 optionally includes wherein the transmitter includes an automatic dependent surveillance-broadcast out transmitter.

Example 31 is a method for interrupting a flight maneuver of a drone, the method comprising: receiving, by the drone, a flight signal including a flight command for preforming the flight maneuver, the flight signal provided by a user of the drone; receiving, by the drone, an interruption signal including an interrupt command to interrupt the flight maneuver, the interruption signal provided by an authority; and interrupting the flight maneuver.

In Example 32, the subject matter of Example 31 optionally includes wherein the authority is law enforcement.

In Example 33, the subject matter of any one or more of Examples 31-32 optionally include wherein the interruption signal is received in response to the drone entering a no-fly zone.

In Example 34, the subject matter of any one or more of Examples 31-33 optionally include wherein interrupting the flight maneuver includes immediately interrupting power to a portion of a flight mechanism of the drone.

In Example 35, the subject matter of any one or more of Examples 31-34 optionally include wherein interrupting the flight maneuver includes gradually reducing power to a portion of a flight mechanism of the drone.

In Example 36, the subject matter of any one or more of Examples 31-35 optionally include receiving location data that identifies a particular location for the drone to land.

In Example 37, the subject matter of Example 36 optionally includes wherein the particular location is an initial launch site of the drone.

In Example 38, the subject matter of any one or more of Examples 36-37 optionally include wherein the particular location is a landing site controlled by the authority.

In Example 39, the subject matter of any one or more of Examples 31-38 optionally include wherein the interrupt command includes a command to prevent further input to the drone by the user.

In Example 40, the subject matter of any one or more of Examples 31-39 optionally include wherein interrupting the flight maneuver includes delaying interrupting the flight maneuver by a predetermined time after receiving the interruption signal.

In Example 41, the subject matter of Example 40 optionally includes wherein the interruption signal includes data defining the predetermined time.

In Example 42, the subject matter of any one or more of Examples 31-41 optionally include authenticating the interruption signal.

In Example 43, the subject matter of any one or more of Examples 31-42 optionally include transmitting a position of the drone to the authority.

In Example 44, the subject matter of any one or more of Examples 31-43 optionally include transmitting registration information of the drone to the authority.

Example 45 is at least one computer-readable medium comprising instructions to perform any of Examples 31-44.

Example 46 is an apparatus comprising means for performing any of Examples 31-44.

Example 47 is at least one computer-readable medium comprising instructions that, when executed by a processor, cause the processor to: receive a flight signal including a flight command for preforming a flight maneuver, the flight signal provided by a user of a drone; receive an interruption signal including an interrupt command to interrupt the flight maneuver, the interruption signal provided by an authority; and interrupt the flight maneuver.

In Example 48, the subject matter of Example 47 optionally includes wherein the authority is law enforcement.

In Example 49, the subject matter of any one or more of Examples 47-48 optionally include wherein the interruption signal is received in response to the drone entering a no-fly zone.

In Example 50, the subject matter of any one or more of Examples 47-49 optionally include wherein interrupting the flight maneuver includes immediately interrupting power to a portion of a flight mechanism of the drone.

In Example 51, the subject matter of any one or more of Examples 47-50 optionally include wherein interrupting the flight maneuver includes gradually reducing power to a portion of a flight mechanism of the drone.

In Example 52, the subject matter of any one or more of Examples 47-51 optionally include wherein the instructions further cause the processor to receive location data that identifies a particular location for the drone to land.

In Example 53, the subject matter of Example 52 optionally includes wherein the particular location is an initial launch site of the drone.

In Example 54, the subject matter of Example 52 optionally includes wherein the particular location is a landing site controlled by the authority.

In Example 55, the subject matter of any one or more of Examples 47-54 optionally include wherein the interrupt command includes a command to prevent further input to the drone by the user.

In Example 56, the subject matter of any one or more of Examples 47-55 optionally include wherein interrupting the flight maneuver includes delaying interrupting the flight maneuver by a predetermined time after receiving the interruption signal.

In Example 57, the subject matter of Example 56 optionally includes wherein the interruption signal includes data defining the predetermined time.

In Example 58, the subject matter of any one or more of Examples 47-57 optionally include wherein the instructions further cause the processor to authenticate the interruption signal.

In Example 59, the subject matter of any one or more of Examples 47-58 optionally include wherein the instructions further cause the processor to transmit a position of the drone to the authority.

In Example 60, the subject matter of any one or more of Examples 47-59 optionally include wherein the instructions further cause the processor to transmit registration information of the drone to the authority.

Example 61 is a system for interrupting a flight maneuver of a drone by an authority, the system comprising: means for receiving a flight signal including a flight command for preforming the flight maneuver, the flight signal provided by a user of the drone; means for receiving an interruption signal including an interrupt command to interrupt the flight maneuver, the interruption signal provided by the authority; and means for interrupting the flight maneuver.

In Example 62, the subject matter of Example 61 optionally includes wherein the authority is law enforcement.

In Example 63, the subject matter of any one or more of Examples 61-62 optionally include wherein the interruption signal is received in response to the drone entering a no-fly zone.

In Example 64, the subject matter of any one or more of Examples 61-63 optionally include wherein the means for interrupting the flight maneuver include means for immediately interrupting power to a portion of a flight mechanism of the drone.

In Example 65, the subject matter of any one or more of Examples 61-64 optionally include wherein the means for interrupting the flight maneuver include means for gradually reducing power to a portion of a flight mechanism of the drone.

In Example 66, the subject matter of any one or more of Examples 61-65 optionally include means for receiving location data that identifies a particular location for the drone to land.

In Example 67, the subject matter of Example 66 optionally includes wherein the particular location is an initial launch site of the drone.

In Example 68, the subject matter of any one or more of Examples 66-67 optionally include wherein the particular location is a landing site controlled by the authority.

In Example 69, the subject matter of any one or more of Examples 61-68 optionally include wherein the interrupt command includes a command to prevent further input to the drone by the user.

In Example 70, the subject matter of any one or more of Examples 61-69 optionally include wherein the means for interrupting the flight maneuver include means for delaying interrupting the flight maneuver by a predetermined time after receiving the interruption signal.

In Example 71, the subject matter of Example 70 optionally includes wherein the interruption signal includes data defining the predetermined time.

In Example 72, the subject matter of any one or more of Examples 61-71 optionally include means for authenticating the interruption signal.

In Example 73, the subject matter of any one or more of Examples 61-72 optionally include means for transmitting a position of the drone to the authority.

In Example 74, the subject matter of any one or more of Examples 61-73 optionally include means for transmitting registration information of the drone to the authority.

Example 75 is an apparatus operated by an authority for interrupting a flight maneuver of a drone operated by a user, the apparatus comprising: a processor; and a memory storing instructions that, when executed by the processor, cause the processor to: determine that the drone is operating in airspace over which the authority has jurisdiction, determine a flight restriction exists for the airspace, and in response to determining that the flight restriction exists, transmit an interruption signal to the drone, the interruption signal including an interrupt command to interrupt a flight maneuver being executed by the drone.

In Example 76, the subject matter of Example 75 optionally includes wherein the instructions, when executed by the processor, further cause the processor to authenticate the interruption signal.

In Example 77, the subject matter of any one or more of Examples 75-76 optionally include wherein the authority is law enforcement.

In Example 78, the subject matter of any one or more of Examples 75-77 optionally include wherein the instructions, when executed by the processor, further cause the processor to receive notification of the flight restriction for the airspace.

In Example 79, the subject matter of any one or more of Examples 75-78 optionally include wherein the apparatus is a component of a second drone.

In Example 80, the subject matter of any one or more of Examples 75-79 optionally include wherein the apparatus is a component of a helicopter.

In Example 81, the subject matter of any one or more of Examples 75-80 optionally include wherein the apparatus is a component of a terrestrial station.

Example 82 is a method for interrupting, by an authority, a flight maneuver executed by a drone operated by a user, the method comprising: determining, by a computing device including a processor, that the drone is operating in airspace over which the authority has jurisdiction; determining, by the computing device, a flight restriction exist for the airspace; and transmitting, by a transmitter in communication with the computing device, an interruption signal to the drone, the interruption signal including an interrupt command to interrupt the flight maneuver executed by the drone.

In Example 83, the subject matter of Example 82 optionally includes authenticating the interruption signal.

In Example 84, the subject matter of any one or more of Examples 82-83 optionally include receiving notification of a flight restriction for the airspace.

In Example 85, the subject matter of any one or more of Examples 82-84 optionally include wherein the authority is law enforcement.

Example 86 is at least one computer-readable medium comprising instructions to perform any of Examples 82-85.

Example 87 is an apparatus comprising means for performing any of Examples 82-85.

Example 88 is a system for interrupting, by an authority, a flight maneuver executed by a drone operated by a user, the system comprising: means for determining that the drone is operating in airspace over which the authority has jurisdiction; means for determining a flight restriction exist for the airspace; and means for transmitting an interruption signal to the drone, the interruption signal including an interrupt command to interrupt the flight maneuver executed by the drone.

In Example 89, the subject matter of Example 88 optionally includes means for authenticating the interruption signal.

In Example 90, the subject matter of any one or more of Examples 88-89 optionally include means for receiving notification of a flight restriction for the airspace.

In Example 91, the subject matter of any one or more of Examples 88-90 optionally wherein the authority is law enforcement.

Example 92 is at least one computer-readable medium including instructions that, when executed by a processor, cause the processor to: determine that a drone is operating in airspace over which an authority has jurisdiction; determine a flight restriction exist for the airspace; and transmit an interruption signal to the drone, the interruption signal including an interrupt command to interrupt a flight maneuver executed by the drone and provided by a user.

In Example 93, the subject matter of Example 92 optionally includes wherein the instructions further cause the processor to authenticate the interruption signal.

In Example 94, the subject matter of any one or more of Examples 92-93 optionally include wherein the instructions further cause the processor to receive notification of a flight restriction for the airspace.

In Example 95, the subject matter of any one or more of Examples 92-94 optionally include wherein the authority is law enforcement.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A drone operated by a user and interruptible by an authority, the drone comprising:
   a flight mechanism for executing a flight maneuver provided by the user;
   a receiver to receive; from the authority, an interruption signal, the interruption signal including a command to interrupt the flight maneuver provided by the user;
   a navigation transmitter to transmit; to the flight mechanism, the command to interrupt the flight maneuver to the flight mechanism; and
   an authentication module to authenticate the interruption signal, wherein the command to interrupt the flight maneuver includes a command to immediately interrupt power to a portion of the flight mechanism.

2. The drone of claim 1, wherein the authority is law enforcement.

3. The drone of claim 1, wherein the command to interrupt the flight maneuver further includes a command to gradually reduce power to a portion of the flight mechanism.

4. The drone of claim 1, wherein the command to interrupt the flight maneuver further includes a command to land the drone at a particular location.

5. The drone of claim 1, wherein the command to interrupt the flight maneuver further includes a command to prevent further input to the drone by the user.

6. The drone of claim 1, wherein the command to interrupt the flight maneuver is transmitted at a predetermined time after receiving the interruption signal.

7. The drone of claim 1, wherein the receiver includes at least one of the following: an automatic dependent surveillance-broadcast in receiver and a cellular receiver.

8. At least one non-transitory computer-readable medium comprising instructions that, when executed by a processor, cause the processor to:
   receive a flight signal including a flight command for preforming a flight maneuver, the flight signal provided by a user of a drone;
   receive an interruption signal including an interrupt command to interrupt the flight maneuver, the interruption signal provided by an authority;
   authenticate the interruption signal; and
   interrupt the flight maneuver,
   wherein interrupting the flight maneuver includes immediately interrupting power to a portion of a flight mechanism of the drone.

9. The at least one non-transitory computer-readable medium of claim 8, wherein the authority is law enforcement.

10. The at least one non-transitory computer-readable medium of claim 8, wherein interrupting the flight maneuver further includes gradually reducing power to a portion of a flight mechanism of the drone.

11. The at least one non-transitory computer-readable medium of claim 8, wherein the instructions further cause the processor to receive location data that identifies a particular location for the drone to land.

12. A method for interrupting a flight maneuver of a drone, the method comprising:
   receiving, by the drone, a flight signal including a flight command for preforming the flight maneuver, the flight signal provided by a user of the drone;
   receiving, by the drone, an interruption signal including an interrupt command to interrupt the flight maneuver, the interruption signal provided by an authority;
   authenticating the interruption signal; and
   interrupting the flight maneuver,
   wherein interrupting the flight maneuver includes immediately interrupting power to a portion of a flight mechanism of the drone.

13. The method of claim 12, wherein interrupting the flight maneuver further includes gradually reducing power to a portion of a flight mechanism of the drone.

14. The method of claim 12, further comprising receiving location data that identifies a particular location for the drone to land.

15. The method of claim 12, wherein the interrupt command includes a command to prevent further input to the drone by the user.

16. The method of claim 12, wherein interrupting the flight maneuver further includes delaying interrupting the flight maneuver by a predetermined time after receiving the interruption signal.

17. A system for interrupting a flight maneuver of a drone by an authority, the system comprising:
   means for receiving a flight signal including a flight command for preforming the flight maneuver, the flight signal provided by a user of the drone;
   means for receiving an interruption signal including an interrupt command to interrupt the flight maneuver, the interruption signal provided by the authority; and
   means for interrupting the flight maneuver.

18. The system of claim 17, further comprising means for authenticating the interruption signal.

19. The system of claim 17, further comprising means for transmitting a position of the drone to the authority.

20. The system of claim 17, further comprising means for transmitting registration information of the drone to the authority.

* * * * *

UNITED STATES PATENT AND TRADEMARK OFFICE
CERTIFICATE OF CORRECTION

PATENT NO. : 10,450,064 B2
APPLICATION NO. : 15/274637
DATED : October 22, 2019
INVENTOR(S) : Vaughn et al.

Page 1 of 1

It is certified that error appears in the above-identified patent and that said Letters Patent is hereby corrected as shown below:

In the Claims

In Column 16, Line 60, in Claim 1, delete "receive;" and insert --receive,-- therefor In Column 16, Line 63, in Claim 1, delete "transmit;" and insert --transmit,-- therefor Signed and Sealed this
Twenty-sixth Day of May, 2020

Andrei Iancu
*Director of the United States Patent and Trademark Office*